April 5, 1955      R. L. MILLER      2,705,742
HIGH SPEED CONTINUOUS SPECTRUM ANALYSIS
Filed Sept. 15, 1951      5 Sheets-Sheet 1

INVENTOR
R. L. MILLER
BY
Harvey C. Hart
ATTORNEY

April 5, 1955          R. L. MILLER          2,705,742

HIGH SPEED CONTINUOUS SPECTRUM ANALYSIS

Filed Sept. 15, 1951          5 Sheets-Sheet 3

INVENTOR
R. L. MILLER
BY
Harry C. Hart
ATTORNEY

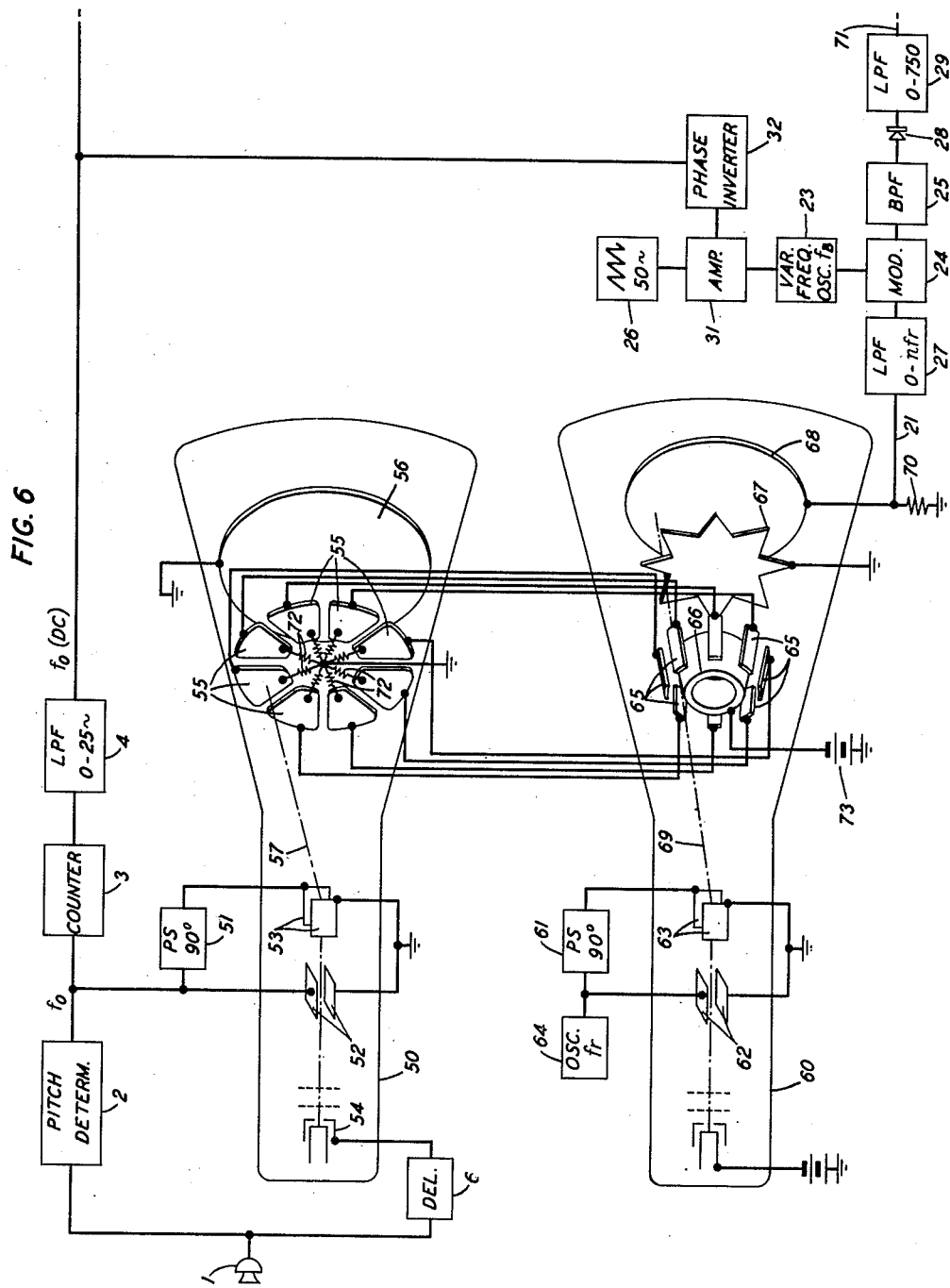

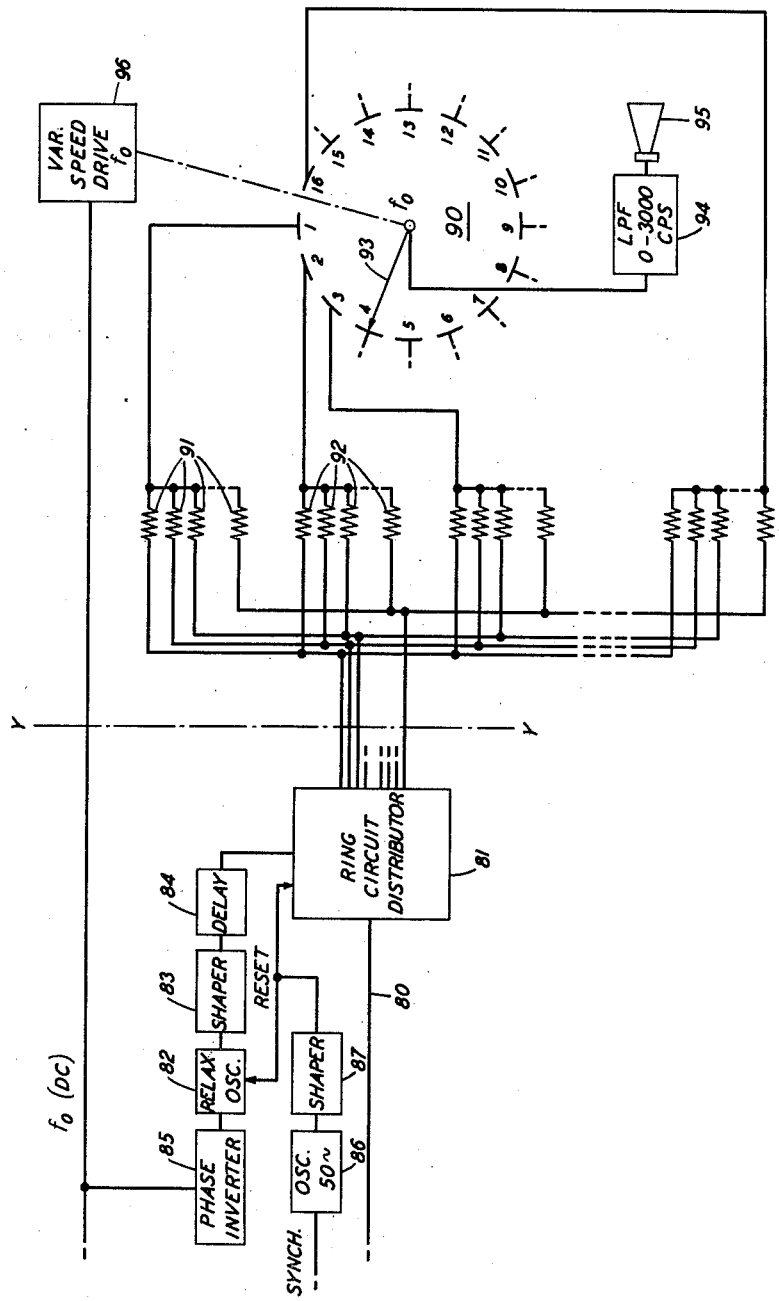

United States Patent Office 2,705,742
Patented Apr. 5, 1955

2,705,742

HIGH SPEED CONTINUOUS SPECTRUM ANALYSIS

Ralph L. Miller, Chatham, N. J., assignor to Bell Telephone Laboratories, Incorporated, New York, N. Y., a corporation of New York Application September 15, 1951, Serial No. 246,831

10 Claims. (Cl. 179—1)

This invention relates to wave analysis and particularly to the rapid and contemporaneous determination of indicia of the frequency and the harmonic structure of a wave which may be varying in pitch and in character, e. g., a voice wave. Such indicia, when determined in accordance with the invention, may be utilized to control a spectrum display device or they may be transmitted to a receiver station where a replica of the original wave may be reconstructed from them either by known apparatus or by novel means to be described. Because of the characteristics of the indicia, they may be transmitted over a channel of restricted band width, thus permitting substantial transmission economies. Furthermore, the novel characteristics of the indicia permit the employment of simplified message reconstruction apparatus.

In Dudley Patent 2,151,091, there is described a narrow band transmission system of the so-called "vocoder" variety in which the message waves are divided into two portions, and these portions are then analyzed to determine certain of their fundamental distinguishing characteristics. One of these portions is subjected to a process by which the original fundamental frequency of the message wave is determined. The result of this process may appear in the form of a unidirectional voltage whose magnitude varies slowly at a rate corresponding to the syllabic rate of the original message. This voltage may be transmitted directly to the receiver station for use in the message reconstruction process, or it may be used to control the magnitude of a single-frequency alternating voltage which may in turn be transmitted to the receiving station for use in the message reconstruction process, as is explained in the Dudley patent.

The second portion of the divided signal is further divided into a number of fixed-frequency subbands, each of which is then subjected to a detection process by which the energy included within that band is determined. This process produces a number of slowly varying currents or voltages, the magnitude of each being at each instant representative of the wave energy in a corresponding subband. These slowly varying currents, which collectively constitute so-called amplitude pattern control currents, are transmitted to a receiving station where they control the amplitude-frequency distribution of the reconstructed message wave.

Apparatus of this character operates as intended when the fundamental frequency of the message wave is such that each of its harmonic components falls squarely in the center of the pass band of one of the filters. But when, as is often the case, the message harmonics frequencies fall at the edges of these pass bands or between them, false indications result. As the message wave varies in frequency, this effect, which has been termed the "comb" effect, occurs at each subband boundary within the signal frequency band.

It has been proposed by R. C. Mathes in his application Serial No. 74,064, filed February 2, 1949, that the "comb" effect may be avoided by replacing the bank of fixed filters of the Dudley patent by a group of tunable filters, the pass band of each filter being centered on one harmonic of the message wave, each filter being continuously tuned to remain so centered by a signal derived from a pitch-defining circuit, which, as in the Dudley patent, measures the fundamental frequency of the message wave. In other words, each filter "tracks" one harmonic. As a result, those filters of the Dudley system whose pass bands fall between adjacent harmonics of the message wave are in the Mathes system dispensed with. But the economy which results from the reduction in the number of filters required is to a great extent offset by the increased complexity and cost of each one. The individual filters of the Mathes system may be tuned by virtue of saturable magnetic cores or by equivalent means, electrical, mechanical, or optical.

The present invention deals, as does the Mathes application, with the "comb effect" problem and has for one of its principal objects the reduction in the number of subbands required for the amplitude pattern control currents of a vocoder transmission system. A subsidiary object is to effect this reduction without introducing a corresponding increase in the complexity of individual filters. Accordingly, instead of providing that the filters shall track the pitch variations of the message wave, the present invention provides that the message wave itself shall undergo a preliminary normalization process of such nature that the fundamental and each of its harmonic components remains fixed on the frequency scale. This permits the employment of fixed filters instead of tunable ones and in numbers no greater than the number of harmonics to be transmitted.

The foregoing and other objects of the invention are attained by first forming a space pattern record of a single wave-length of the message, the fundamental message wave frequency being preferably utilized to control this recording step, then repeatedly scanning this record at a repetition frequency $f_r$ to derive a signal having a fixed fundamental frequency $f_r$ and harmonics of frequencies $2f_r$, $3f_r$, ... $nf_r$, analyzing this derived signal to derive indications of the amplitudes of its fundamental and harmonic components, and finally utilizing these indications together with the fundamental message frequency indication, either to construct a display of the message wave spectrum or, after transmission to a receiver station, to reconstruct the message.

The signal thus derived by the repeated high frequency scanning of the record is characterized by a spectrum whose components are the same, both in their relative amplitudes and in their phase relations, as the spectrum components of the original message. It has, however, a frequency band which is wider than that of the original message by a factor $n$, equal to the number of times each recorded wavelength is repeated in the scanning process. By the same token adjacent harmonics of the transformed message are spaced apart on the frequency scale more widely than are the corresponding harmonics of the original message, and by the same factor. This permits the substitution of a heterodyne filter, i. e., the combination of a modulator, a variable frequency oscillator, and a single fixed filter, for the bank of fixed filters of the ordinary vocoder analyzer, and it permits, too, of the use of a filter whose pass band is $n$ times as wide as that of one of the fixed filters and whose energy growth and decay times are, correspondingly, $n$ times as short. Without such transformation of the message frequency band, this substitution is impossible without a great sacrifice in speed of analysis or of resolution, either in the Mathes system with its tunable filters or in the Dudley system with its filters which, though they are fixed, greatly outnumber the harmonics to be transmitted.

The space pattern record may conveniently comprise a group of sample-holding units such as clamp circuits or the targets of a cathode beam tube, provided care is exercised to insure that the process of scanning the record shall not erase it. Subsidiary features of the invention are found in the novel apparatus described below which meets these requirements.

Aside from greatly simplifying the analysis process and the apparatus with which it is carried out, the preliminary frequency normalization of the signal permits the employment at a receiver station of greatly simplified message wave reconstruction apparatus in which at each instant the energy contents of the several harmonics are added together to provide a reconstructed message sample, the entire message being in turn composed of the sequence of such samples.

The invention will be fully apprehended from the following detailed description of preferred illustrative embodiments thereof taken in connection with the appended drawings, in which.

Figure 3:
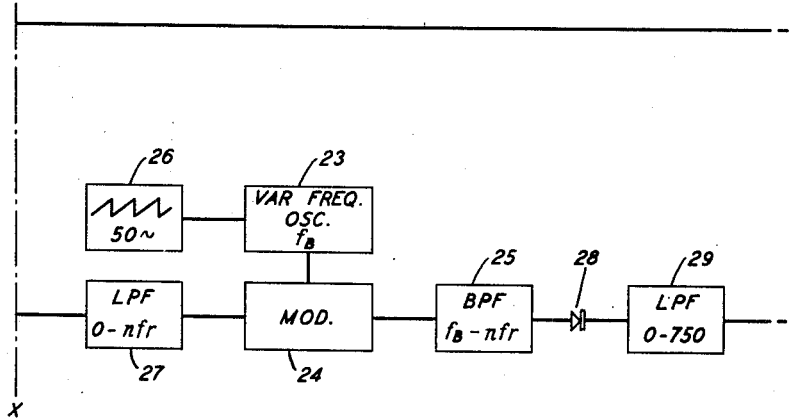
Figure 3A:
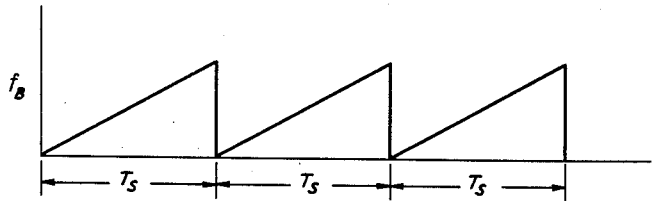
Figure 2:
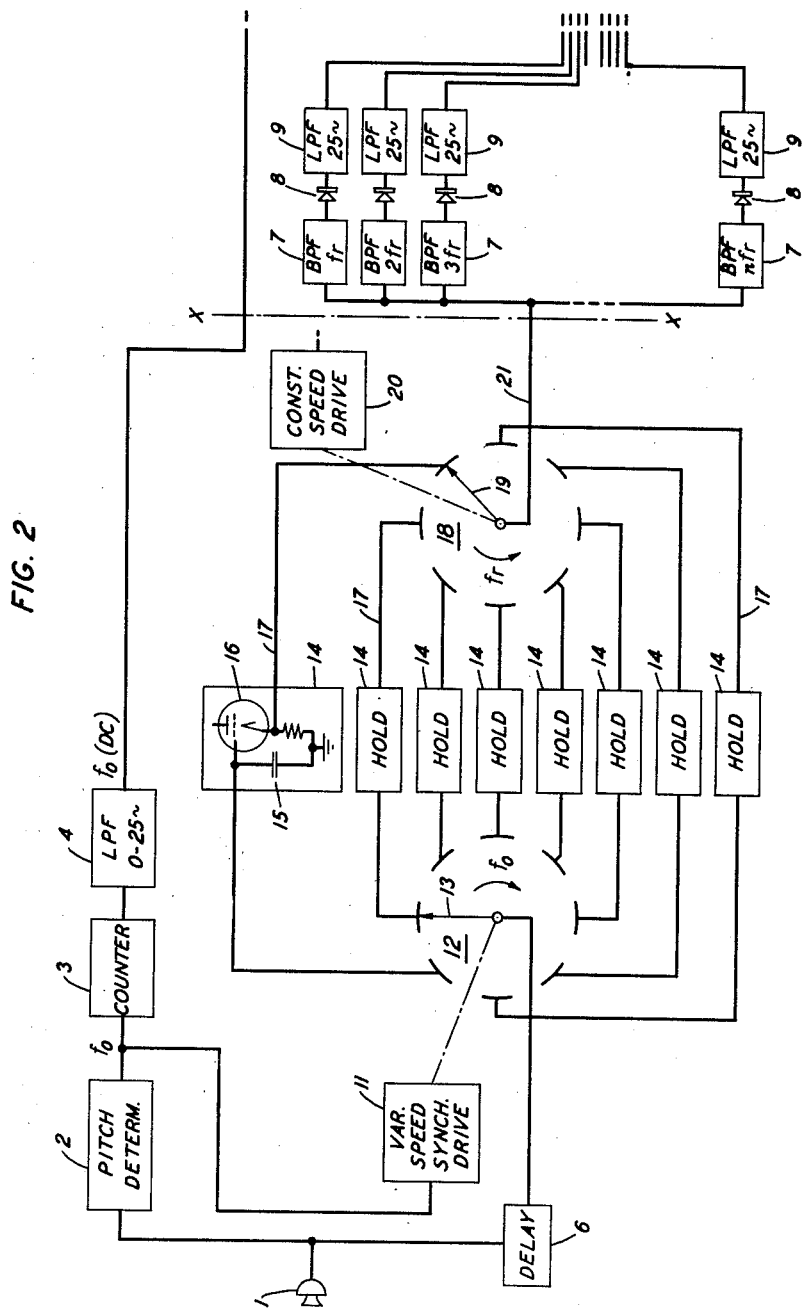
Fig. 2 is a block schematic diagram showing apparatus elements coordinated in accordance with the invention in one of its forms.
Figure 4:
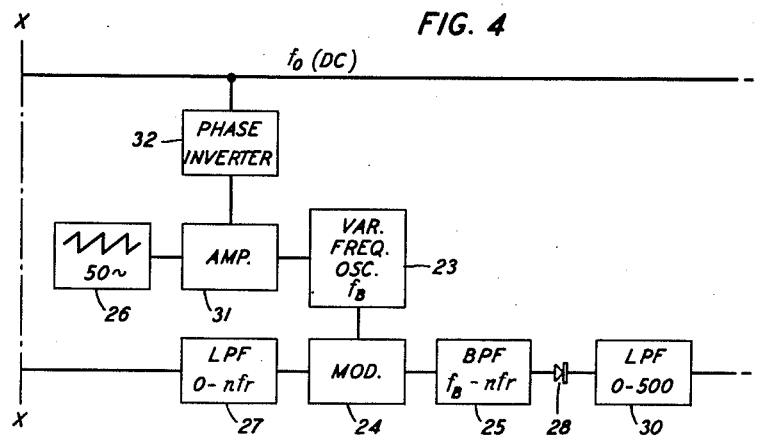
Figure 4A:
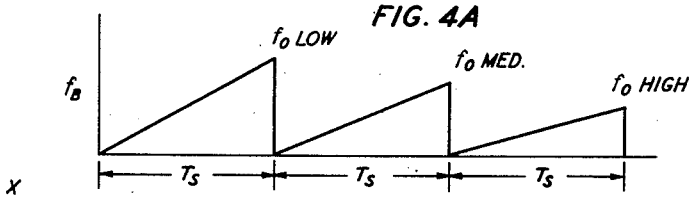
Figure 5:
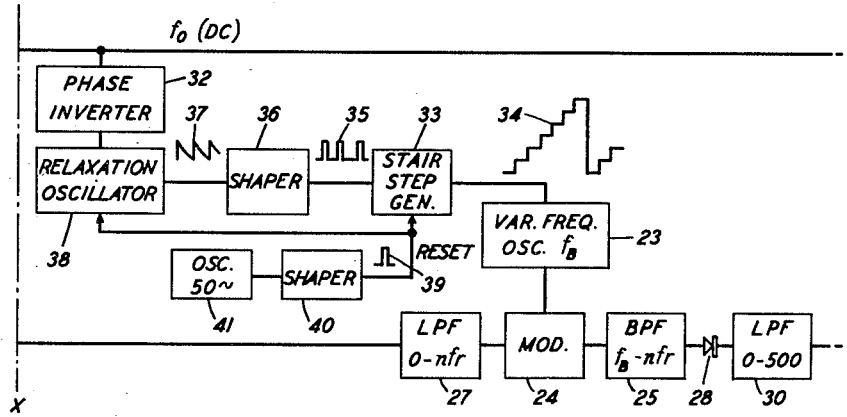
Figure 5A:
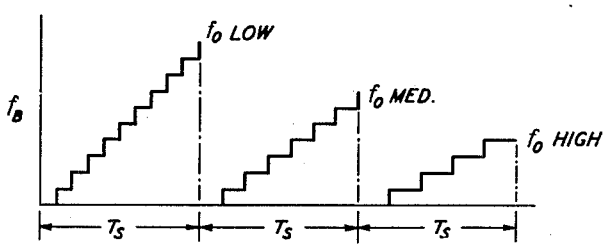

Figs. 3, 4, and 5 are schematic circuit diagrams showing apparatus alternative to a part of the apparatus of Fig. 2;

Figs. 3A, 4A, and 5A are wave form diagrams of assistance in explaining the operation of the apparatus of Figs. 3, 4, and 5, respectively;

Fig. 6 is a schematic circuit diagram showing electronic apparatus partly in perspective alternative to the apparatus of Fig. 2; and Fig. 7 is a schematic circuit diagram showing receiver apparatus for synthesizing a message from signals generated in accordance with the invention.

Figure 1:
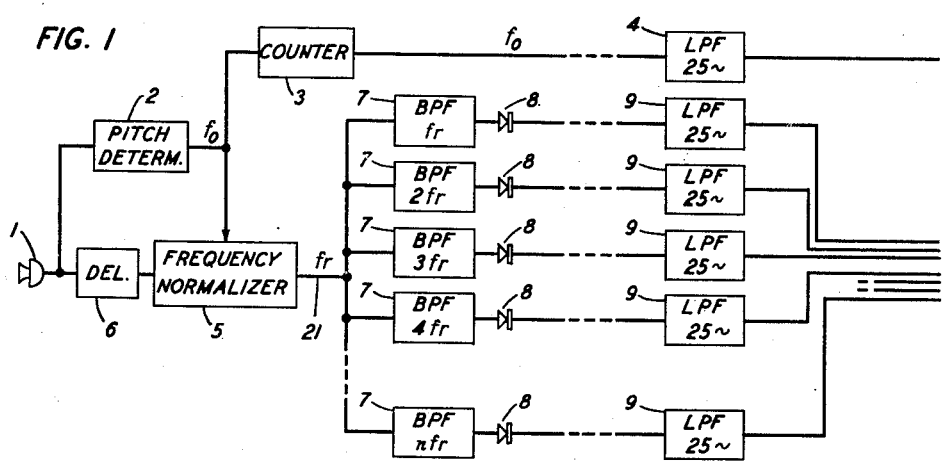
Fig. 1 is a block schematic diagram illustrating the mode of operation of the invention.

Referring now to the drawings and especially to Fig. 1, a message to be transmitted, for example a voice wave originating in a telephone instrument 1, enters each of two parallel paths. In the first path, the fundamental frequency of the message is segregated from the frequencies of other components present and is determined by apparatus which may be broadly designated as a pitch-defining circuit 2. Such apparatus is well known in the art and may be of any suitable variety such, for example, as that described in Riesz Patent 2,522,539. This circuit delivers a signal having a well-defined frequency $f_0$, equal to the fundamental frequency of the message. A counter 3 converts this into a signal which varies slowly at syllabic rates and whose magnitude at any instant is proportional to the fundamental frequency of the message wave. It is passed through a low pass filter 4 whose passband may extend, for example, from zero to 25 cycles per second. It is then transmitted to a receiver station in any desired fashion.

The pitch-defined signal is also applied to a frequency normalizer 5 where it acts as a control signal, causing the frequency normalizer to transform any wave applied to its input terminals into another wave having the same harmonic structure and a new fundamental frequency, i. e., a standard or reference frequency $f_r$ in place of the original fundamental message frequency $f_0$. This unit is connected, in tandem with a delay device 6 which serves to compensate for delays introduced by the pitch-defining circuit 2, in series with the second message path. Therefore, when a message wave of fundamental frequency $f_0$ and a given harmonic structure is applied to the input terminal of the normalizer 5, another wave having a constant reference fundamental frequency $f_r$ and the same harmonic structure appears on its output conductor 21.

This reference wave is now applied to a bank of band pass filters 7 of which the first is tuned to the reference frequency $f_r$, the second is tuned to its second harmonic, namely, $2f_r$, the third to its third harmonic $3f_r$, and so on, the last filter 7 of the bank being tuned to the $n$th harmonic of the reference frequency, $nf_r$. In this connection, the number of filters employed is dependent solely on the quality of the reproduction expected, and therefore on the number of harmonics it is desired to reproduce.

The output of each of the filters 7 of this bank is now rectified by a rectifier 8 to provide a slowly varying signal which varies only at syllabic rates, its magnitude being proportional at any instant to the energy passing through the filter to which it is connected. These signals may now be applied to low pass filters 9 having bands extending, for example, from zero to 25 cycles per second, and thereupon transmtted to a receiver station in any desired fashion. As a practical matter, thirty such channels may be employed, making a total band width of 30×25 or 750 cycles per second for the amplitude pattern control currents.

One form of apparatus for carrying out the frequency normalization step described above in connection with Fig. 1 is shown in schematic form in Fig. 2. Here, as in Fig. 1, the message originating at the microphone 1 enters two paths in parallel. In the upper path, the fundamental frequency is defined and accentuated by a pitch determining circuit 2 and applied to a counter 3 which generates a steady voltage proportional to this fundamental frequency for transmission by way of a low pass filter 4 as in the case of Fig. 1. The same defined fundamental frequency is also applied to a variable-speed synchronous drive unit 11 which drives a distributor in synchronism with the varying fundamental frequency $f_0$, one revolution corresponding precisely to one fundamental period. In a partly mechanical system, the distributor may be a commutator 12 and the drive unit may be a synchronous motor which advances its wiper arm 13 from each commutator bar to the next. But as a practical matter, it is preferred to employ an electronic distributor such as a ring circuit of multivibrators, in which case the synchronous drive may be a relaxation oscillator which operates to step the ring along from stage to stage under the influence of the varying fundamental frequency $f_0$. However, for the sake of clarity of illustration, a commutator 12 is shown, and this illustration is to be taken as representative and symbolic.

In the second path, the voice wave passes, by way of a delay device 6 which compensates for delays introduced in the upper branch, to the wiper arm 13 of the distributor 12 which, as described above, rotates with a varying frequency $f_0$. It thus acts to place upon the several segments of this commutator 12 samples of the voice wave taken at regular intervals over a single wavelength of the message. It is the exact synchronism between the fundamental message frequency $f_0$ as it is applied to the wiper arm 13 as a signal on the one hand and as a variable speed drive on the other which ensures that each complete revolution of the wiper arm 13 around the commutator 12 shall occupy exactly the same time as a single wavelength of the message and that, therefore, the samples so applied to the successive segments of the commutator 12 shall be equally spaced over a single message fundamental wavelength. For clarity of illustration, only 8 distributor segments are shown. With a thirty-channel system, 30 such segments are required.

The several segments of the commutator 12 are individually connected to holding circuits 14 of any desired variety. A holding circuit of convenient form comprises a condenser 15 connected to the grid of a triode 16 which in turn is connected as a cathode follower to an output lead 17. The voltage on the condenser 15 and so the voltage on the output lead 17 are directly proportional to the magnitude of the message sample which has most recently been applied to that segment of the commutator 12 which is connnected to this condenser. At any instant, the message samples stored on the holding circuits 14 thus constitute a space record of a single period or wavelength of the message.

The output conductors 17 of the several holding circuits 14 are connected individually to the segments of a second distributor 18 which, like the distributor 12, is shown symbolically and illustratively as a mechanical commutator while, as a practical matter, electronic apparatus may be preferred. The wiper arm 19 of this commutator 18 is driven at a constant speed as by a motor 20, so that it rotates at a frequency $f_r$ and in a direction to pick off the signal message samples from the holding circuits 14 in the same order as that in which they were laid down.

The wiper arm 19 of the distributor 18 is connected by way of a conductor 21 to a bank of filters 7 which, as in the case of Fig. 1, are narrow band pass filters whose midband frequencies are adjusted to the distributor repetition frequency $f_r$, and to its several harmonics $2f_r$, $3f_r$ ... $nf_r$. The outputs of these several filters are then individually rectified by rectifiers 8 and passed through low pass filters 9 to outgoing conductors as in the case of Fig. 1, there being one such output conductor for each of the distributor segments—eight as shown, thirty as contemplated in a practical system.

The connection of the individual bars of the distributor 12 to the individual bars of the distributor 18 in effect operates to transfer the message samples taken at regular intervals over a single fundamental period of the message wave to the distributor 18 with preservation of the harmonic structure of the message. But because the wiper 19 arm of the distributor 18 rotates at a speed $f_r$, the time signal which is recovered by virtue of picking up these successive samples in succession has a fundamental frequency of $f_r$ instead of a fundamental frequency $f_0$. Thus, by first making a space record of a single wavelength of the signal, here illustrated as a distribution of message samples on the several segments of the left-hand commutator 12, and then recovering a time signal from this space record at a repetition frequency $f_r$, it has been possible to transform the original message into a new derived signal whose frequency has been normalized to the constant value $f_r$. Since its harmonic structure is unchanged by this process, each of its harmonic components is similarly normalized to a fixed frequency. This permits the employment of a bank of filters 7 whose passbands are fixed on the frequency scale at the fundamental and the several harmonics of the frequency $f_r$. These filters may have quite narrow pass bands, the band width of each being sufficient only to pass syllabic frequencies, for example, 25 cycles per second. Furthermore, the portions of the frequency scale lying between these harmonic frequencies need not be provided with filters because, when the harmonic analysis is carried out in this fashion, no energy is to be found except at the several harmonic frequencies in question. Thus, the large number of fixed band filters of earlier transmission systems of the vocoder type are dispensed with.

In accordance with a further feature of the invention, the repetition frequency $f_r$ is preferably a comparatively high frequency, for example, 100 times as high as the lowest message fundamental frequency to be expected. Thus, for each single space record message wavelength laid down on the left-hand distributor 12, 100 or so wavelengths are picked up by the wiper arm 19 of the right-hand distributor 18 and applied to the filters 7 in parallel. As is well known in the art of signal analysis, a large number of repeated applications of the wave to be analyzed to the analyzing filters permits the analysis to be carried out with greater speed and with high resolution. Accordingly, and by way of example, the frequency $f_r$ may be set, for example, at 10,000 cycles in which case the mid-band frequencies of the several filters are set at 10,000, 20,000, 30,000 etc., cycles per second. Narrow band filters in this part of the frequency range are easy to construct, and therefore economical.

Fig. 3 shows a schematic circuit diagram of apparatus alternative to that part of the apparatus of Fig. 2 which lies to the right of the broken line marked X—X and in which the major features are the substitution of a heterodyne filter for the bank of fixed filters of Fig. 2, and the corresponding substitution of time division transmission of the several harmonics for the conductor separation of Fig. 2. It is known that any wave analysis which may be carried out with a bank of $n$ fixed filters may also be carried out with a heterodyne filter of the same band width as one of the bank filters at the price of a reduction in the speed of analysis by a factor equal to the number of filters in the bank. But in the present system this reduction in the speed of analysis is more than offset in the following fashion:

The time scale of the phenomenon being analyzed is reduced by a factor as great or greater than this speed reduction, or in other words, the frequency scale of the phenomenon is increased to the same extent. This change of scale is effected by selecting the repetition frequency $f_r$ at a value which is $n$ or more times as great as the highest message fundamental frequency $f_0$ to be encountered. In consequence of this choice adjacent harmonics of the repetition frequency $f_r$ and $n$ times as widely spaced as are the corresponding harmonics of the message. This in turn permits the use of an analyzing filter whose pass band is $n$ or more times as wide as before and therefore whose speed of energy growth and decay is $n$ times as great. As a result the time required for analysis of each single harmonic is so short that a complete harmonic analysis of the whole transformed message can be carried out in the same time span as could the original analysis of the untransformed message by the filter bank, i. e., it can be carried out at the same rate as the production of the original message wave. Thus the analysis may take place contemporaneously with the generation of the message. Thus in the present instance, the heterodyne filter of Fig. 3 comprises a variable frequency oscillator 23, a modulator 24 to which the transformed signal is applied, and a fixed band filter 25 constructed to pass a modulation product of the transformed message and the output of the variable frequency oscillator 23. The frequency of the oscillator 23 is varied under control of a sweep generator 26 of any desired construction which delivers a sawtooth wave, Fig. 3A, at a constant repetition rate, for example 50 cycles per second. This causes the frequency of the oscillator 23 to sweep through a preassigned range such that, for each of the several harmonics of the frequency $f_r$ applied to it, the oscillator has, at some instant in its frequency variation cycle, a frequency such that its modulation product with the particular harmonic passes the band pass filter 25. The harmonics are applied by way of a low pass filter 27 which is proportioned to suppress components higher than the $n$th harmonic. The output of the band pass filter 25 may now be rectified, 28, to deliver a signal of magnitude which is at each instant proportional to the filter energy, and this in turn may be passed through a low pass filter 29.

In the filter bank systems of Figs. 1 and 2, the amplitude pattern control currents are transmitted by way of a number of parallel paths, one for each harmonic, and the band width of each path is limited to pass only syllabic frequencies. Taking the upper limit of significant syllabic frequencies as approximately 25 cycles per second and, as above stated, taking the number of message harmonics to be transmitted as 30, the systems of Figs. 1 and 2 provide for 30 channels of 25 cycles band width each or a total band of 750 cycles per second. The fundamental pitch of the human voice may be expected to vary from about 100 to about 300 cycles per second and its total band width extends up to about 3000 cycles per second and rarely exceeds this figure. This means that the low pitched voice is rich in harmonics, having significant harmonics up to about the 30th, while the high pitched voice is purer, harmonics above about the 10th being comparatively insignificant. Experience with vocoder transmission systems indicates that amplitude control currents occupying a band of only 750 cycles, distributed among 30 channels, can adequately represent and reproduce such voices.

In the heterodyne filter arrangement of Fig. 3, employing one channel filter 29 instead of 30, its band is therefore 30 times as wide for comparable performance, and it has thus been shown in Fig. 3 as extending from zero to 750 cycles per second.

But the heterodyne filter arrangement which is shown in a simple form in Fig. 3 lends itself to a still further economy in that, with a modification of the scanning cycle as described below, it is possible to reduce the frequency band width of the transmission channel somewhat, e. g., from a 750-cycle band to a band in the range 250 to 500 cycles, depending on the quality desired. This possibility arises from the fact that the human voice whose fundamental pitch is high is characterized by a much smaller number of significant harmonics than is one whose fundamental pitch is low. Accordingly, it becomes possible to restrict the sweeping oscillator 23 to scan only the significant harmonics in any case, that is, 30 harmonics for a voice whose fundamental pitch is 100 cycles per second, 15 harmonics for one whose fundamental pitch is 200 cycles per second, and only 10 harmonics for one whose fundamental pitch is 300 cycles per second, and so on. Thus there are on the average, fewer than 30 different harmonics to be transmitted. To this end, the oscillator frequency sweep rate may be varied in coordination with the variations of the fundamental message frequency in such fashion that when the message fundamental frequency is low, the oscillator sweep through a large number of harmonics of the repetition frequency $f_r$, while when the message fundamental frequency is high, it sweeps through a smaller number of harmonics. Such an oscillator frequency variation is shown in the graph, Fig. 4A. To this end, an amplifier 31 of variable gain is shown in Fig. 4, interposed between the oscillator 23 and the saw-tooth sweep generator 26, and the gain of this amplifier 31 is controlled in inverse fashion by the fundamental frequency $f_0$ which appears on the conductor. The inverse gain control unit may be of any desired variety, a simple phase inverter 32 such as a plate-loaded triode to whose grid the $f_0$ (DC) control current is applied being sufficient.

As an additional refinement, time may be further economized in the analysis by causing the oscillator frequency to jump rapidly from the value appropriate for any one of the harmonics to the value appropriate for the next harmonic, dwelling sufficiently long at each of these values to enable the modulation product energy to build up in the analyzing band pass filter 25. This requirement is met by causing the oscillator frequency to vary in stairwave fashion, as indicated in Fig. 5A. Means are well known to generate waves having this form, and to vary an oscillator frequency accordingly, being shown, for example, in Electronics for April 1946, page 133, and in "Wave Forms," Radiation Laboratory (MIT) series, vol. 19, page 617. A refinement of such a stair-wave generator in which provision is made to insure that the risers of the stairs be always of equal height is described and shown in an application of G. H. Marmont and B. M. Oliver, Serial No. 650,978, filed February 28, 1946, now Patent No. 2,607,892, issued August 19, 1952.

Fig. 5 shows apparatus which is otherwise similar to Fig. 4 but in which the continuous frequency sweep of Fig. 4 is replaced by such a stair-wave sweep. The stair-wave generator 33 which replaces the saw-tooth wave oscillator 26 of Fig. 4 is shown as delivering an output 34 of successive incremental steps, one for each of a sequence of input pulses 35. These, in turn, are derived by a shaper 36 from relaxation pulses 37 of variable repetition rate which may be generated by apparatus such as a conventional relaxation oscillator 38. The pulse frequency of the latter is controlled by way of a phase inverter 32 from the slowly varying signal which represents the fundamental frequency $f_0$ of the message. Thus, the shaper 36 delivers to the stair-wave generator 33 a sequence of pulses which are alike in magnitude and duration but whose spacing is inversely related to the fundamental frequency $f_0$. The stair-wave generator 33 then generates the required wave 34 which is applied as a control signal to the variable frequency oscillator 23. As a consequence, the oscillator frequency is stepped to successive values, dwelling at each one sufficiently long to allow the modulation product energy to build up in the band pass filter 25. Successive like steps are added in numbers depending on the fundamental message frequency, until the full sweep time shall have elapsed, whereupon both the relaxation oscillator 38 and the stair-wave generator 33 are reset to their zero conditions by a pulse 39 derived by way of a shaper 40 from a sweep control unit which in this case may be a simple oscillator 41 having a frequency of, for example, 50 cycles per second.

Fig. 6 shows an alternative to the apparatus of the earlier figures employing cathode-beam tubes 50, 60, each of which comprises a cathode, accelerating and focusing electrodes, horizontal and vertical beam deflecting elements to which phase split voltages are applied.

The phase splitting of the applied deflecting voltage may be secured in any desired fashion. In the case of the upper tube 50, 90-degree phase splitter 51 is shown connected between the vertical plates 52 and the horizontal plates 53, and energized at the fundamental frequency $f_0$ of the message wave. In addition, the upper tube 50 comprises a control electrode 54 to which the message to be analyzed is applied, an array of charge holding targets 55, and a collector anode 56 which may be grounded. The lower tube 60, on the other hand, has applied to its deflecting elements 62, 63 a voltage of the frequency $f_r$ derived from an oscillator 64 and, at its further end, another array of deflecting elements 65 arranged in the fashion of barrel staves about a central circular element 66, a star-shaped screen 67 and a target 68 connected by way of a load resistor 70 to ground.

The structural details of the cathode beam tubes, being entirely conventional, have been omitted as have also miscellaneous ancillary apparatus such as bias sources for the various electrodes.

In operation, the message originating at the telephone instrument 1 is divided into two parts as before, its fundamental frequency is determined by the pitch defining circuit 2 and applied to the vertical deflecting plates 52 of the upper tube 50 and, after a phase delay of one-quarter cycle, to the horizontal deflecting plates 53. This causes the cathode beam 57 of the upper tube to follow a circular path, rotating at the frequency $f_0$, and impinge on one after the other of the several targets 55. Electrons of the beam which pass between the targets 55 are drained off by way of the grounded collector electrode 56. At the same time the message wave itself is applied, after being delayed by the delay device 6 to compensate for the delay introduced by the pitch determination, to the control electrode 54 of the upper tube 50. Thus, as the beam 57 rotates, its intensity is modulated in accordance with the message wave. As a result, a charge is placed on each of the several targets 55 of the upper tube 50 which is proportional to the amplitude of the message wave taken at the instant at which the beam 57 impacts that target. The charge-holding capacities of the targets may be increased, if desired, by the connection of an external condenser in parallel with each of them. Since, as before, the signal which causes the beam 57 to rotate, namely, the fundamental frequency $f_0$ applied to the deflecting plates 52, 53, is synchronized with the fundamental frequency of the message to be analyzed, these message samples applied to the several targets 55 of the upper tube 50 are taken at equally spaced instants over a single full wavelength of the message.

Each of the individual targets 55 of the upper tube 50 is directly connected to a barrel stave electrode 65 of the lower tube 60 and these connections are in order. Thus, there is applied to each barrel stave electrode 65 of the lower tube 60 a deflecting voltage which is proportional to the message sample charge stored on the connected target 55 of the upper tube 50. The beam 69 generated by the cathode of the lower tube is rotated by phase-split voltages derived from an oscillator 64 of frequency $f_r$. The magnitude of the deflecting voltage is to be adjusted by well-known means not shown so that, in the absence of voltage variations applied to the barrel stave electrodes 65 due to charge variations on the targets 55 of the upper tube, the beam 69 of the lower tube 60 travels a circular path bounded on the inside by the solid ring electrode 66 and on the outside by the ring-shaped array of barrel stave electrodes 65. It is then intercepted by the successive points of the star-shaped electrode 67, one-half way from the tip of the star point to its shoulder. This interception takes place approximately one half the time while the beam 69 travels unimpeded between star points to strike the collector electrode 68 the remaining half of the time. This gives rise to a sequence of pulses on the output load resistor 70 of equal magnitude at a rate $nf_r$, where $n$ is now the number of barrel staves 65 or the number of points on the star 67.

Now, when the voltages on the barrel stave deflecting electrodes 65 are varied as described above by virtue of their connections to targets 55 of the upper tube 50 on which message sample charges are stored, the beam 69 of the lower tube 60 departs from its circular path and undergoes a radial fluctuation. When it is deflected inwardly, it is interrupted by the star-shaped electrode 67 for a greater fraction of the cycle, while when it is deflected outwardly, it is so interrupted for a smaller fraction of the cycle. Thus, application of a positive signal sample charge variation to any target 55 of the upper tube 50 results in an increase in the current pulse on the load resistor 70, while application of a negative charge results in a reduction of such current pulse. Accordingly, the sequence of current pulses appearing on the output load resistor 70 is modulated in accordance with the spectral character of the message wave and the frequency of each full cycle of such pulse variations is equal to $f_r$, the standard repetition frequency. The remainder of the apparatus, at the lower right-hand part of Fig. 6, is identical with the apparatus of Fig. 4. Thus, the output conductor 71 in Fig. 6 carries a signal which is the precise counterpart of that carried by the output conductor of Fig. 4.

The absolute electric charge delivered by the electrons of the cathode beam of the upper tube 50 to the several targets 55 is, of course, always negative. It can, however, easily be arranged that the value of this charge for the unmodulated beam 57 of the upper tube 50 shall produce no deflection of the beam 69 of the lower tube 60 from its circular path. This may be accomplished in various ways. For example, each of the targets 55 of the upper tube 50 may be connected by way of a high resistor 72 to ground. This connection serves to bring the potentials of the targets 55 of the upper tube 50, and so the barrel stave deflecting electrodes 65 of the lower tube 60, to a particular value depending on the magnitudes of the resistors 72. It is a simple matter to connect the central circular electrode 66 of the lower tube 60 to a potential source 73 of appropriate polarity and magnitude such that, under these conditions, the beam 69 of the lower tube travels in its circular path in the absence of a signal.

The fixed-frequency harmonic structure of the transformed message wave which is generated in accordance with the invention and which may be transmitted to a receiver station in any desired fashion permits the use at the receiver station, as an alternative to known apparatus which may also be used, of message reconstruction apparatus which is improved and simplified as compared with the message wave reconstruction apparatus of the usual vocoder systems, such, for example, that of Dudley Patent 2,151,091, in that it requires no filters. Fig. 7 shows such reconstruction apparatus in schematic form particularly adapted to synthesize a message from the signals generated by the transmitter apparatus of Figs. 4 and 5, i. e., signals which are in time division form. These signals, after transmission to a receiver station, are applied by way of a conductor 80 to a ring circuit distributor 81 having a number of output terminals equal to the number of harmonics which it is desired to receive. This distributor is stepped along by pulses generated by a relaxation oscillator 82 reduced to standard amplitude and duration by a shaper 83 and delayed by a delay device 84 to compensate for delays elsewhere in the system as a whole. An especially important purpose served by this delay device 84 is to allow the energy of the new oscillator frequency in Fig. 5 to build up in the analyzing filter 25 on the occurrence of each new step, Fig. 5A, before this energy is applied to the synthesizer. The relaxation oscillator frequency may be controlled in inverse proportion to the fundamental pitch of the message by a control signal derived from the incoming $f_0$ line and passed through a phase inverter 85. This apparatus operates in the same fashion as the corresponding apparatus shown in Fig. 5. Likewise, as in Fig. 5, provision is made to reset the relaxation oscillator 82 to commence the ensuing cycle by pulses derived from a 50-cycle oscillator 86 and reduced to standard form by a shaper 87. The same reset pulses are also applied to restore the ring circuit distributor 81 to its initial condition at the conclusion of each full cycle. The reset oscillator 86 may be held in phase with the corresponding unit at the transmitter station, e. g., the oscillator 41 of Fig. 5, by a synchronizing signal of conventional character.

The output points of the ring distributor are severally connected to the input conductors of the synthesizer proper. A distributor is provided which, like the other distributors described above, may be electronic but which for purposes of illustration is conventionally shown as a commutator 90. This commutator is provided with $2n$ segments where $n$ is the number of harmonics being transmitted, and each of these segments is multipled to all of the output terminals of the distributor 81 by way of resistors 91, 92, etc. These resistors are proportioned in magnitude in cyclic variation fashion for the particular harmonics in question. Thus for example, the first harmonic conductor which carries a signal related to the variations of the fundamental component $f_r$ is connected to the first of the $2n$ segments by way of the first of resistors 91, to the second segment by way of the first of resistors 92, and so on. There are thus $2n$ such resistors and their magnitudes vary in sinusoidal fashion measured around the commutator. For example, supposing there are 60 segments, the resistor connected to the first segment may have a value of 1000 ohms, the resistor connected to the sixteenth one, one-quarter way around the circle, may have the value 2000 ohms, the resistor connected to the thirty-first one, half-way around the circle, may have the value 1000 ohms, the resistor connected to the forty-sixth one, three-quarters way around the circle, may have the value 0 ohms and so on. On the other hand, the second harmonic conductor is similarly multipled to all of the $2n$ segments by way of the second resistor of the several groups, but these resistors are now varied cyclically through two full cycles in going around the commutator. Similarly, the resistors which interconnect the third harmonic conductor with the commutator segments are varied in magnitude through three full cycles, and so on to the resistors which interconnect the thirtieth harmonic conductor which vary through 30 full cycles; that is to say, they alternate in value, for example, between zero and 2000 ohms.

A wiper arm 93 makes contact in succession with each of the segments of the commutator 90, and this wiper arm is connected, by way of a low pass filter 94 which operates to remove high frequency components introduced by the commutator, to a reproducer 95. As will be understood by consideration of known methods of harmonic synthesis, for example, Jewett Patent 1,559,325, it will be understood that the several resistors connected to each of the commutator segments operate as adding devices to cause a current to flow through the wiper arm 93 and the reproducer 95, which current is proportional to the sum of the several harmonic components which exist on the several output conductors of the distributor 81, at the instant at which the wiper arm 93 makes contact with that particular commutator segment. A variable speed drive 96 is therefore provided to advance the wiper arm 93 around the commutator, segment by segment at the cyclic rate $f_0$, picking up signals proportional to these harmonic sums as it goes. The reproducer current therefore consists, at every instant, of an amplitude which is proportional to the sum of the energies in the several harmonics at that instant, and its fundamental frequency $f_0$ is the same as that of the original message.

In the drawing, the wiper arm drive 96 is indicated merely as a variable speed drive operating at the message fundamental frequency $f_0$. It is to be maintained in approximate synchronism with the message fundamental frequency $f_0$ as determined at the transmitter station. This may be accomplished in any desired fashion well known in the art. Since, however, exactness of phase is not required, it is unnecessary to transmit the fundamental signal frequency as such, the slowly-varying control current whose magnitude is proportional to $f_0$ being sufficient.

If the variable sweep refinement of Figs. 4 and 5 is not employed but rather the regular sweep of Fig. 3, the apparatus of Fig. 7 may be modified merely by omission of the relaxation oscillator frequency control by the fundamental message frequency $f_0$.

If, on the other hand, the apparatus of Fig. 1 or of Fig. 2 is employed at the transmitter station, then the portion of Fig. 7 to the left of the line Y—Y may be entirely omitted, the individual output conductors of the transmitter apparatus being severally connected to the individual input points of the synthesizer apparatus.

In the usual vocoder transmission system, special provision is made for the recognition and analysis at the transmitter station, and the synthesis at the receiver station, of unvoiced sounds. With the present system, no such special provision is necessary. The apparatus treats an unvoiced sound in the same way that it treats a voiced sound, always searching for a definite fundamental frequency and a definite wavelength. Because the unvoiced sound is aperiodic, no such definite fundamental frequency exists. Therefore, the apparent fundamental frequency recognized by the pitch defining circuit shifts about in a random fashion, and the effect, in the system as a whole, is to provide reproduction of unvoiced sounds as well as voiced ones.

Instead of reconstructing the message by the apparatus of Fig. 7 or other apparatus, the spectrum itself may, if preferred, be displayed for visual examination, either after transmission to a receiver station or at the transmitter station itself. To this end, any convenient display apparatus may be employed, such as a cathode ray oscilloscope, a moving tape on which marks are made by spark discharge from an electrode which is moved transversely of the tape, or otherwise as desired. For purposes of so-called visual speech, it is preferable first to transform the spectrum pattern control currents back to their original locations on the frequency scale. To this end, it is only necessary to cause the vertical deflection of the cathode beam representative of frequency to move under the combined influence of the particular harmonic instantaneously encountered and of the fundamental frequency itself as originally determined by the pitch-defining circuit. The apparatus of Fig. 5 furnishes convenient means for producing this result. At the same time the horizontal deflection of the beam, which is proportional to time, may take place in regular fashion, while the intensity of the cathode beam is modulated in accordance with the strength of the message harmonic instantaneously encountered. Obvious modifications of the apparatus known as the visible speech cathode ray translator described by R. R. Riesz and L. O. Schott in the Journal of the Acoustical Society of America for July 1946, vol. 17, page 50, may if desired be employed.

What I claim is:

1. Apparatus for analyzing a wave which comprises means for deriving a sequence of $n$ samples of said wave which are equally spaced over a single wavelength, means for holding each of said samples, means for repeatedly scanning said holding means at a repetition frequency $f_r$ to derive a signal having a fundamental frequency $f_r$ and harmonics of frequencies $2f_r$, $3f_r$, ... $nf_r$, means for analyzing said derived signal to derive indications of the amplitudes of its fundamental and harmonic components, and means for transmitting said indications to a distant point where they may be utilized in combination in the reconstruction of said wave.

2. Apparatus as defined in claim 1 wherein the scanning is repeated at a fixed frequency $f_r$.

3. Apparatus as defined in claim 2 wherein said signal analyzing means comprises a plurality of fixed narrow band filters whose midband frequencies are fixed at $f_r$, $2f_r$, $3f_r$ . . . $nf_r$, the band width of each of said filters being substantially less than the separation on the frequency scale between said mid-frequencies.

4. Apparatus as defined in claim 2 wherein said signal analyzing means comprises a modulator, a source of variable carrier frequency, and a fixed narrow band filter tuned to a modulation product of the frequency of said carrier source and of said repetition frequency, and means responsive to said control signal for varying the frequency of said carrier source through a required frequency range at a rate such as to enable the buildup of energy in said narrow band filter for each modulation product.

5. Apparatus as defined in claim 2 wherein said signal analyzing means comprises a modulator, a source of variable carrier frequency, and a fixed narrow band filter tuned to a modulation product of the frequency of said carrier source and of said repetition frequency, and means responsive to said control signal for varying the frequency of said carrier source in stairstep fashion so that it dwells at each of a plurality of values for a time sufficient to enable the buildup of energy in said narrow band filter and jumps rapidly from each of said frequencies to the next.

6. Apparatus for analyzing and reconstructing a wave which comprises variable speed means for making a space pattern record of each of a succession of short portions of said wave, means for deriving from said wave a control signal which is an indication of the fundamental frequency of said wave, means responsive to said control signal for varying the speed of said record-making means to restrict each of said short portion records to a single full wave-length of said wave, means for repeatedly scanning each of said single full wavelength records at a repetition frequency $f_r$ to derive an output signal having a fundamental frequency $f_r$ and harmonics of frequencies $2f_r$, $3f_r$, . . . $nf_r$, where $n$ is the order of the highest required harmonic, means for analyzing said output signal to derive indications of the amplitudes of its fundamental and harmonic components, and means for combining said indications to reconstruct said wave.

7. Apparatus for analyzing a wave which comprises variable speed means for making a space pattern record of each of a succession of short portions of said wave, means for deriving from said wave a control signal which is an indication of the fundamental frequency of said wave, means responsive to said control signal for varying the speed of said record-making means to restrict each of said short portion records to a single wavelength of said wave, means for repeatedly scanning each of said single full wavelength records at a fixed repetition frequency $f_r$ to derive an output signal having a fundamental frequency $f_r$ and harmonics of frequencies $2f_r$, $3f_r$, . . . $nf_r$, where $n$ is the order of highest required harmonic, and means for analyzing said output signal to derive indications of the amplitudes of its fundamental and harmonic components, said output signal analyzing means comprising a plurality of fixed narrow band filters whose midband frequencies are fixed at $f_r$, $2f_r$, $3f_r$, . . . $nf_r$, the bandwidth of each of said filters being substantially less than the separation on the frequency scale between said mid-frequencies.

8. Apparatus for analyzing a wave which comprises variable speed means for making a space pattern record of each of a succession of short portions of said wave, means for deriving from said wave a control signal which is an indication of the fundamental frequency of said wave, means responsive to said control signal for varying the speed of said record-making means to restrict each of said short portion records to a single full wavelength of said wave, means for repeatedly scanning each of said single full wavelength records at a fixed repetition frequency $f_r$ to derive an output signal having a fundamental frequency $f_r$ and harmonics of frequencies $2f_r$, $3f_r$, . . . $nf_r$, where $n$ is the order of the highest required harmonic, and means for analyzing said output signal to derive indications of the amplitudes of its fundamental and harmonic components, said output signal analyzing means comprising a modulator, a source of variable carrier frequency, and a fixed narrow band filter tuned to a modulation product of the frequency of said carrier source and of said repetition frequency, and means responsive to said control signal for varying the frequency of said carrier source through a required frequency range at a rate such as to enable the buildup of energy in said narrow band filter for each modulation product.

9. Apparatus for analyzing a wave which comprises variable speed means for making a space pattern record of each of a succession of short portions of said wave, means for deriving from said wave a control signal which is an indication of the fundamental frequency of said wave, means responsive to said control signal for varying the speed of said record-making means to restrict each of said short portion records to a single wavelength of said wave, means for repeatedly scanning each of said single full wavelength records at a fixed repetition frequency $f_r$ to derive an output signal having a fundamental frequency $f_r$ and harmonics of frequencies $2f_r$, $3f_r$, . . . $nf_r$, where $n$ is the order of the highest required harmonic, and means for analyzing said output signal to derive indications of the amplitudes of its fundamental and harmonic components, said output signal analyzing means comprising a modulator, a source of variable carrier frequency, and a fixed narrow band filter tuned to a modulation product of the frequency of said carrier source and of said repetition frequency, and means responsive to said control signal for varying the frequency of said carrier source in stairstep fashion so that it dwells at each of a plurality of values for a time sufficient to enable the buildup of energy in said narrow band filter and jumps rapidly from each of said frequencies to the next.

10. Apparatus for analyzing and reconstructing a wave which comprises variable speed means for making a space pattern record of each of a succession of short portions of said wave, means for deriving from said wave a control signal which is an indication of the fundamental frequency of said wave, means responsive to said control signal for varying the speed of said record-making means to restrict each of said short portion records to a single wavelength of said wave, means for repeatedly scanning each of said single full wavelength records at a repetition frequency $f_r$ to derive an output signal having a fundamental frequency $f_r$ and harmonics of frequencies $2f_r$, $3f_r$, . . . $nf_r$, where $n$ is the order of the highest required harmonic, and means for analyzing said output signal to derive indications of the amplitudes of its fundamental and harmonic components, and means for combining said harmonic component indications with said fundamental frequency indicating control signal to reconstruct said wave.

References Cited in the file of this patent

UNITED STATES PATENTS

| | | |
|---|---|---|
| 2,465,355 | Cook | Mar. 29, 1949 |
| 2,570,858 | Rajchman | Oct. 9, 1951 |
| 2,629,000 | Olson et al. | Feb. 17, 1953 |